United States Patent

King et al.

[15] 3,669,925
[45] *June 13, 1972

[54] THERMALLY STABLE DYEABLE POLYESTERS HAVING IMPROVED DYED LIGHTFASTNESS

[72] Inventors: Henry L. King; Eugene L. Ringwald, both of Cary, N.C.; James C. Randall, Jr., Bartlesville, Okla.

[73] Assignee: Monsanto Company, St. Louis, Mo.

[ * ] Notice: The portion of the term of this patent subsequent to June 6, 1989, has been disclaimed.

[22] Filed: April 28, 1970

[21] Appl. No.: 32,676

Related U.S. Application Data

[63] Continuation-in-part of Ser. No. 824,092, May 13, 1969, and a continuation-in-part of Ser. No. 789,528, Jan. 7, 1969, abandoned, and a continuation-in-part of Ser. No. 873,333, Nov. 13, 1969.

[52] U.S. Cl. ........................... 260/45.95, 8/DIG. 4, 260/77
[51] Int. Cl. ........................................................ C08g 17/08
[58] Field of Search ................... 260/77, 75 T, 40 P, 45.95; 8/165, 179, DIG. 4

[56] References Cited

UNITED STATES PATENTS

| | | | |
|---|---|---|---|
| 2,556,295 | 6/1951 | Pace | 260/75 X |
| 2,895,946 | 7/1959 | Huffman | 260/75 |
| 2,905,657 | 9/1959 | Huffman | 260/75 |
| 3,033,824 | 5/1962 | Huffman | 260/75 |
| 3,042,656 | 7/1962 | Frey | 260/77 |
| 3,223,752 | 12/1965 | Tate et al. | 260/873 |
| 3,461,468 | 8/1969 | Morgan et al. | 260/75 T |

FOREIGN PATENTS OR APPLICATIONS

| | | |
|---|---|---|
| 13,272 | 6/1969 | Japan |
| 3,113 | 2/1970 | Japan |

*Primary Examiner*—Melvin Goldstein
*Attorney*—Thomas Y. Awalt, Jr., Robert L. Broad, Jr., Neal E. Willis and E. J. Fischer

[57] ABSTRACT

Modified polyester filaments having over conventional polyester filaments, improved inherent thermal stability in the presence of oxygen and inherent disperse dye uptake, without the significant loss in dye lightfastness typical of such modified filaments, are produced from terephthalic acid; glycols; small amounts of mixtures of compounds having a typical general formula: $R-O[G-O]_x-H$, where R is an alkyl group containing an average of from about 8–20 carbon atoms; G is a hydrocarbon radical selected from the group consisting of ethylene, propylene and isomers thereof, butylene and isomers thereof, and mixtures of the above; and $x$ has an average value of from 8–20, and is about equal to or greater than R; small amounts of manganous ion; and small amounts of a hindered phenol preferably selected from the group consisting of 4, 4'-butylidenebis (6-t-butyl-m-cresol) and 2, 2'-butylidenebis (6-t-butyl-m-cresol). Polyfunctional chain-branching agents in amounts up to about 0.7 mole percent, based on the weight of the dicarboxylic acid or ester-forming derivative thereof, may be added, whereby the polymer, with the chain terminators described above, can be polymerized to higher molecular weights by ordinary polymerization techniques.

9 Claims, 3 Drawing Figures

LOSS OF FORMALDEHYDE OF VARIOUS ETHYLENE OXIDE POLYETHERS

DISPERSE DYEABILITY AS A FUNCTION OF R

% DISPERSE DYEABILITY AS A FUNCTION OF X

INVENTORS
HENRY L. KING
EUGENE L. RINGWALD
JAMES C. RANDALL

BY
ATTORNEY

THERMALLY STABLE DYEABLE POLYESTERS HAVING IMPROVED DYED LIGHTFASTNESS

This is a continuation-in-part application of our co-pending applications Ser. No. 824,092, filed May 13, 1969; Ser. No. 789,528, filed Jan. 7, 1969 and now abandoned; and Ser. No. 873,333, filed Nov. 13, 1969.

BACKGROUND OF THE INVENTION

This invention relates to polyesters produced by condensation reactions of polymethylene glycols and dicarboxylic acids or reactive derivatives thereof. It is well known that some polymeric polyesters prepared by the condensation of a glycol or its functional derivatives and a dicarboxylic acid or a polyester-forming derivative thereof, such as an acid halide, a salt, or a simple ester of a dibasic acid and volatile monohydric acid are excellent fiber-forming polymers. Commercially, high polymeric polyesters are prepared, for example by the condensation of terephthalic acid of dimethyl terephthalate and a polymethylene glycol containing from about two to 10 carbon atoms. These polyesters are relatively insoluble, chemically inactive, hydrophobic materials capable of being formed into filaments which can be cold-drawn to produce textile fibers of superior strength and pliability. However, since these materials are not readily permeable to water, they cannot be satisfactorily dyed by ordinary dyeing procedures.

The compact structure of polyethylene terephthalate fibers, for example, the molecules of which are closely packed along the axis of the fibers, makes it quite difficult, except with a limited number of dyes, to obtain a high degree of dyebath exhaustion or to secure satisfactory deep shades. Absorption and penetration of the dye into the fiber core are limited by the inherent properties of the fiber.

A number of methods have been proposed to increase the dyeability of polyesters, and particularly polyethylene terephthalate; however, most have not proved to be entirely satisfactory. These methods have included the use of a number of additives to the polyester and various combinations of drawing and heat-treatment steps and procedures. Unfortunately, the use of most of these known procedures has resulted in thermally unstable polyesters, deterioration in fiber properties, nonuniformly dyed polymers, and the like. Finally, the art has desired some other means to produce thermally stable polyesters having improved dyeability. Thermally stable polyesters having improved dyeability would have significant commercial and practical value and utility.

Our co-pending application Ser. No. 824,092, filed May 13, 1969 describes the use of small amounts of compounds having a typical general formula: $R-O[G-O]_x-H$ where R is an alkyl group containing an average of from about 8–20 carbon atoms; G is a hydrocarbon radical selected from the group consisting of ethylene, polypropylene and isomers thereof, butylene and isomers thereof, and mixtures of the above; and $x$ has an average value of from 8–20, and is about equal to or greater than R. These modified polyester compositions are prepared by reacting an aromatic dicarboxylic acid, the polymethylene glycol and a small amount of the glycol additive under polyesterification conditions until a fiber-forming polymeric polyester composition is obtained. Small amounts of a chain-branching agent may also be added to the reaction as desired. These modified polyester compositions are useful in the production of shaped articles by extrusion, molding, or casting in the nature of yarns, fabrics, films, pellicles, bearings, ornaments, or the like. They are particularly useful in the production of thermally stable textile fibers having improved dyeability, particularly with disperse dyes. One difficulty encountered in the use of such modified polyesters lies in the fact that the substrate alone, as well as the dyed substrate has an inferior lightfastness as compared with a filament comprised of substantially unmodified polyester filament produced under otherwise similar conditions.

Theoretically, this inferior lightfastness occurs by way of absorption of energy at the site in the polymer where spectral characteristics can be slightly modified by a fiber morphology, e.g., the site of the glycol additive. This energy is then transferred to oxygen and possible water molecules resulting in the formation of peroxides. This hydroperoxide formation in the polymer is primarily dependent upon the glycol additive, although to a lesser extent, any diethylene glycol present, ultimately leads to oxidative degradation of the dye molecules.

In our co-pending application Ser. No. 873,333, a process for the improvement of lightfastness qualities in the type of modified polyester described in our co-pending application Ser. No. 824,092, was described. This process involved the use of small amounts of manganous ion which was believed to act as a "quencher" for the excited triplet state of dye molecules in order to prevent dye degradation; at the same time tending to stabilize the polymer substrate, or the alkoxy glycol additive portion thereof, so that heat stability, maintenance of strength, and whiteness of the substrate is also improved.

SUMMARY OF THE INVENTION

It is an object of this invention to provide a modified polyester filament having the inherent superior thermal stability in oxygen or air and disperse dye uptake characteristic of the modified polyesters described in our co-pending application Ser. No. 824,092, filed May 13, 1969, at the same time having a further improved dyed lightfastness and a satisfactory substrate undyed lightfastness.

It is another object of this invention to provide a process for the preparation of modified polyester filaments consisting of at least about 85 percent by weight of an ester of a dihydric alcohol and terephthalic acid with improved lightfastness, both dyes and undyed, as well as the inherent superior thermal stability in oxygen and disperse dye uptake characteristics of these modified polyester filaments.

Briefly, the objects of this invention are accomplished by preparing a fiber-forming polyester from a dicarboxylic acid and a glycol and containing in the polymer molecule a small amount of compounds having a typical general formula: $R-O[G-O]_x-H$, where R is an alkyl group containing an average of from about 8–20 carbon atoms; G is a hydrocarbon radical selected from the group consisting of ethylene, propylene and isomers thereof, butylene and isomers thereof, and mixtures of the above; and $x$ has an average value of from 8–20, and is about equal to or greater than R. Mixtures of these glycols may also be used. The alkoxy glycol additive may be used at concentrations of between about 0.25 and 3 mole percent, based on the weight of the dicarboxylic acid or ester-forming derivative thereof or on each polyester repeating unit. Preferably, the alkoxy glycol additive is present in an amount of from about 0.75 to 2 mole percent, based on the weight of the dicarboxylic acid or ester-forming derivative thereof or on each polyester repeating unit. The use of less than 0.25 mole percent of the alkoxy glycol additive does not give significant improvement in the dyeability in the final product, and when more than 3 mole percent of the additive is employed, undesirable quantities of chain-branching agents are necessary to counteract the tendency of the monohydroxyl additive to restrict the buildup of molecular weight in the final polymeric product. In addition to the alkoxy glycol additive, small amounts of manganous ion are added in the form of a salt which is believed to act as a "quencher" for the excited triplet state of dye molecules in order to prevent dye degradation; and to stabilize the polymer substrate, or the alkoxy glycol additive portion thereof, so that heat stability, maintenance of strength, and whiteness of the substrate are also improved. Further, in addition to the alkoxy glycol additive and small amounts of the manganous ion, a small amount of a hindered phenol, preferably selected from the group consisting of 4, 4, 4,4'-butylidenebis(6-t-butyl-m-cresol) and 2,2'-butylidenebis (6-t-butyl-m-cresol) and the like, is also added to prevent dye degradation by oxidation.

To further understand the invention, reference will be made to the attached drawings that form a part of the present invention:

FIG. 1 is a graph showing the amount of formaldehyde loss at 195° C. for 60 minutes of alkoxy polyethylene glycols varying in the number of ethylene oxide units present in the molecules;

FIG. 2 is a graph showing the relative disperse dyeability in terms of percentage of the dye, based on the weight of the fiber, of polyester fibers modified with alkoxy polyethylene glycols in which the carbon atoms in the alkoxy group represented by R in the general formula, was varied between four and 20, with the number of ethylene oxide units (x) constant at a value of 12–14; and FIG. 3 is a graph showing the relative disperse dyeability in terms of percentage of dye on the weight of the fiber, of polyester fibers modified with an alkoxy polyethylene glycol in which the number of ethylene oxide units (x) was varied from between four and 30, with R constant at a value of from 12–14.

Other objects and advantages of this invention will be apparent from the description which follows.

DESCRIPTION OF THE PREFERRED EMBODIMENTS

Figure 1:
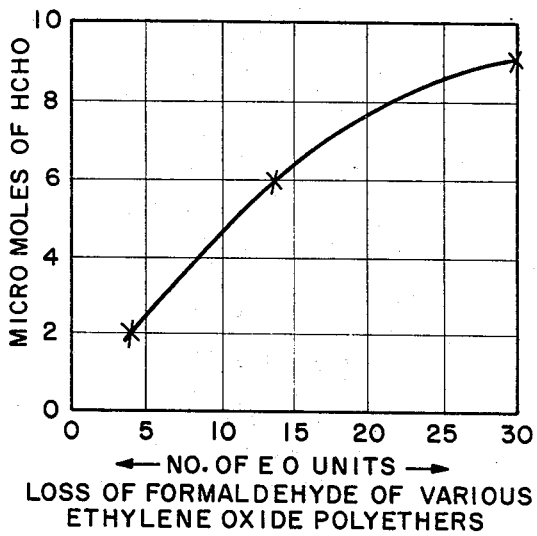

The synthetic linear condensation polyesters contemplated in the practice of the invention are those formed from dicarboxylic acids and glycols, and copolyesters or modifications of these polyesters and copolyesters. In a highly polymerized condition, these polyesters and copolyesters can be formed into filaments and the like and subsequently oriented permanently by drawing. Among the polyesters and copolyesters specifically useful in the instant invention are those resulting from heating one or more of the glycols of the series $HO(CH_2)_nOH$, in which $n$ is an integer from 2 to 10, or cycloaliphatic glycols, with one or more dicarboxylic acids, or ester-forming derivatives thereof. Among the dicarboxylic acids and ester-forming derivatives thereof useful in the present invention there may be named terephthalic acid, isophthalic acid, p,p'-dicarboxybiphenyl, p, p'-dicarboxydiphenylsulfone, p,p'-dicarboxydiphenylmethane, and the aliphatic, cycloaliphatic, and aryl esters and half-esters, ammonium and amine salts, and the acid halides of the above-named compounds, and the like. Examples of the polyhydric alcohols which may be employed in practicing the instant invention are ethylene glycol, trimethylene glycol, tetramethylene glycol, and cyclohexane dimethanol, and the like. Polyethylene terephthalate, however, is the preferred polymer because of the ready availability of terephthalic acid or dimethyl terephthalate and ethylene glycol, from which it is made. It also has a relatively high melting point of about 250° through 265° C., and this property is particularly desirable in the manufacture of filaments in the textile industry.

Additives which are an essential part of this invention include compounds having a typical general formula: $R-O[G-O]_x-H$, where R is an alkyl group containing an average of from about 8–20 carbon atoms; G is a hydrocarbon radical selected from the group consisting of ethylene, propylene and isomers thereof, butylene and isomers thereof, and mixtures of the above; and $x$ has an average value of from 8–20 and is about equal to or greater than R. By "average" is meant that the alkoxy glycol additive may comprise mixtures of the alkoxy glycol with some variances from the figures shown; but that the average of the integers in the mixture will be as indicated. Preferably, the R group contains 12–16 carbon atoms. The optimum degree of polymerization (x) is about 12–16. This additive may be used at concentrations of from about 0.25 to 3 mole percent, based on the weight of the dicarboxylic acid or ester-forming derivative thereof or on each polyester repeating unit. Preferably, the additive is present in amounts of from about 0.75 to 2 mole percent, based on the weight of the dicarboxylic acid or ester-forming derivative thereof or on each polyester repeating unit.

Autoxidation is the phenomenon which is responsible for much of our environmental chemistry. It is involved in the aging of fats and oils, drying of paints, and degradation of natural and synthetic fibers. The processes involved may be catalyzed by heat or light and are free radical by nature. Generally speaking, autoxidation proceeds by free radical, chain mechanisms; peroxy radicals and hydroperoxide groups are formed which are precursors to other products. Typical products from autoxidation processes are alcohols and carbonyl-containing compounds. Chain-terminating reactions significantly affect the rates of autoxidation processes.

The products observed from the autoxidation of alkoxy polyethylene glycols are principally alcohol and formate ester chain-terminal groups and formaldehyde, carbon dioxide, and water. Formaldehyde is a major volatile product. As above stated, significant and surprising differences in thermal stability in the presence of oxygen have been observed among the various alkoxy polyethylene glycols. The type of alkoxy unit and the degree of polymerization are apparently related to the susceptibility of autoxidation.

It has been found, for example, that as the number of carbon atoms in the alkoxy end group (R) is increased beyond the methoxy (with degree of polymerization held constant) there is a surprising degree in the amount of formaldehyde evolved when the glycol additive is heated in a sweep of air at 193° C., until the alkoxy group reaches eight carbon atoms, after which there is a leveling off. Further increase beyond 8–14 carbon atoms in the alkoxy group causes no appreciable differences in the heat stability of the glycol. Exemplifying the above, alkoxy terminated polyethylene glycol polymers having the structural formula: $R-(OCH_2CH_2)_{12}-OH$ were subjected to the above-described conditions, and liberated formaldehyde in accordance with the following table.

TABLE I

| R-Number of Carbon Atoms in Hydrocarbon Unit | $\mu$ mol HCHO | | | | |
|---|---|---|---|---|---|
| | 15 min. | 30 min. | 60 min. | 90 min. | 120 min. |
| 1 | 460 | 800 | 1340 | 1520 | 1700 |
| 4 | 460 | 790 | 1050 | 1140 | 1300 |
| 8 | 320 | 470 | 600 | 720 | 820 |
| 14.5* | 320 | 510 | 770 | 820 | 880 |
| 20 | 450 | 450 | 760 | 720 | 790 |

*alkoxy polyethylene glycol prepared from mixture of 14 and 15 carbon alcohols.

It was also discovered that when these same alkoxy glycols were used as chain terminators in the production of modified polyesters, the heat stability effect was carried over to the polyester fiber.

On the other hand, where the number of carbon atoms in the alkoxy end group was held constant at about 14 and the degree of polymerization of the polyether chain was increased, the compounds being heated in a sweep of air at 195° C., for 60 minutes, there was a marked increase in the number of micromoles of formaldehyde released as the degree of polymerization (number of ethylene oxide units) was increased from about 5 to 30, indicating a decrease in heat stability of the alkoxy glycol as shown by FIG. 1. Therefore, so far as heat stability alone is concerned, and ignoring any possible effect of the relationship of the degree of polymerization to the length of the alkoxy end groups, it appears that an alkoxy poly(oxyalkylene) glycol as described above where R is an alkyl group containing no less than eight carbon atoms, and with an extremely low degree of polymerization would be optimum.

Figure 2:
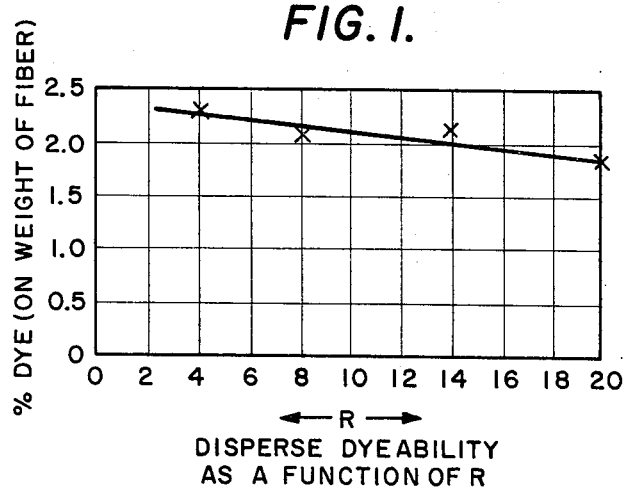
Figure 3:
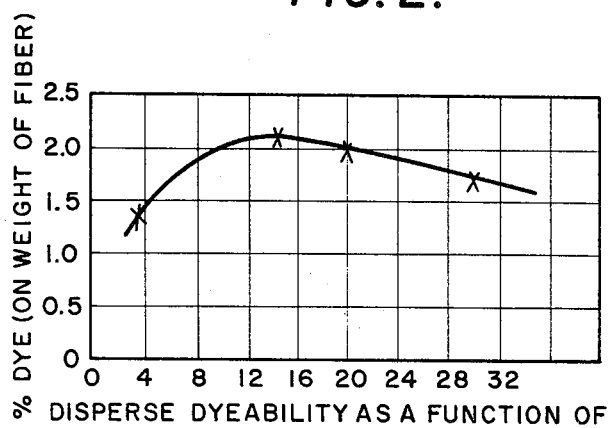

As stated above, however, dyeability of the modified polymer is an extremely important factor so far as the use of these additives is concerned. In FIG. 2, the effect on fiber dyeability of changes in the number of carbon atoms in the alkoxy group (R) with the degree of polymerization (x) being held constant at 11–13 is shown; and in FIG. 3, the effect of changes in the degree of polymerization (x) with R being held constant at 14.5 is shown. FIGS. 2 and 3 show the disperse dyeability of these compounds in terms of percent dye on the weight of the fiber, dyeing being accomplished as explained in Example 1. It will be observed from FIG. 2 that there is a tendency toward decreased dyeability as the number of carbon atoms in the alkoxy end group of the additive increased. FIG. 3 shows a substantial increase in dyeability as the degree of polymerization (x) is increased from about 4 to about 12–14, and thereafter a decrease in dyeability.

A minimum optimum value of 8 representing the number of carbon atoms in the alkoxy end groups has thus been established on the basis of heat stability, and a maximal optimum value of 20 has been established beyond which there is no substantial increase in heat stability, but there is a corresponding decrease in disperse dyeability (FIG. 2).

The degree of polymerization has been established on the basis of dyeability with about 8 as a minimally marginal value and 20 as a marginally maximum value (FIG. 3), with decreasing heat stability across the range (FIG. 2). An additional limiting factor involving the relationship of R to $x$ will be developed in the examples.

The precise structure of G is not considered critical in that the instant invention except insofar as it must exclude the alkoxy (polyoxymethylene) glycols which depolymerize under polyester polymerization conditions. We have found that the alkoxy poly(oxyethylene), alkoxy poly(oxypropylene), and alkoxy poly(oxytetramethylene) glycols (including copolymers and block copolymers) and mixtures thereof produce good results in accordance with this invention.

The above can be partially explained in terms of inhibition of further autoxidation by products formed from the terminal alkoxy groups in the initial stage of oxidation. Those derived from short alkyl chains are volatile at the test temperature, and escape without acting as inhibitors.

When the additive contains an alkoxy group which is an effective inhibitor of autoxidation, the number of alkyleneoxy units in the polyether additive becomes significant. It has been found that chains having more than about 25 units are not adequately stable. This is believed to result from the low concentration of the inhibiting terminal alkoxy group in such a chain. On the other hand, a low number of alkyleneoxy units per molecule results in an excessive number of chain terminations when an adequate weight of the modifier is added to achieve the desired dyeability. Poor processability results from excessive chain termination.

Since the hydrophobic alkyl portion of the additive makes very little, if any, contribution to the enhanced dyeability, it is desirable that a major portion of the molecule be comprised of the hydrophilic polyether chain. Thus, alkoxy poly(oxyalkylene) glycols in which the number of oxyalkylene groups is about equal to or greater than the number of carbon atoms in the alkyl group, resulting in a polymer composed of more than seventy percent by weight of the hydrophilic polyether portion, as will be shown in the examples, are most effective (see Table III). Included within the meaning of "about equal," as used herein, is ±2.

The second additive to the polymerization mix is the manganous ion in the form of a salt such as acetate, formate, terephthalate, succinate, and adipate. It has been found that in amounts of 10–500 parts per million of Mn ion and preferably 50–150 parts per million of Mn, based on the weight of the acid and glycol, dyed lightfastness in the filament product is substantially improved. Where amounts are used in excess of about 200–300 ppm, the product may be somewhat colored by the additive. It has been found that 50–150 parts per million of a hindered phenol preferably selected from the group consisting of 4, 4'-butylidenebis (6-t-butyl-m-cresol) and 2,2'-butylidenebis (6-t-butyl-m-cresol), further improves dyed lightfastness in the filament. Other hindered phenols known to function in a similar manner include the following compounds which are available commercially and known as antioxidants:

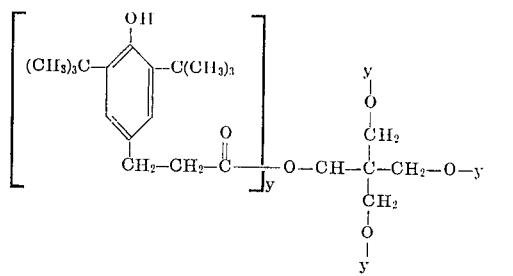

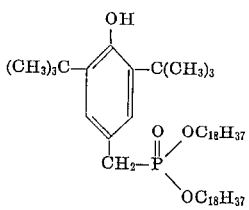

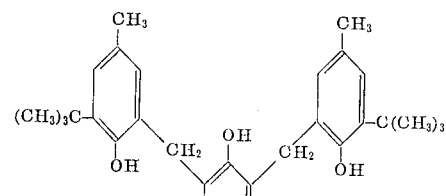

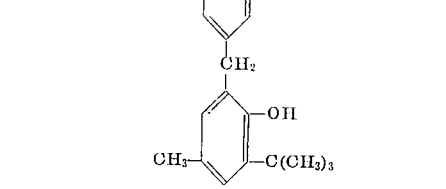

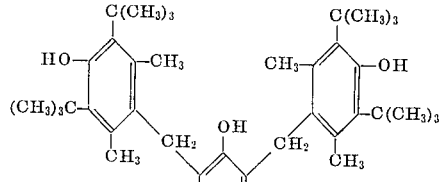

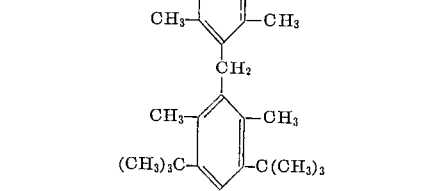

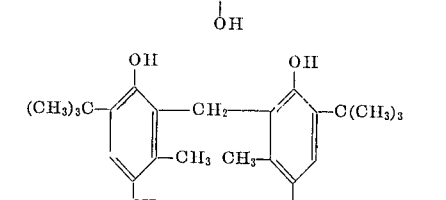

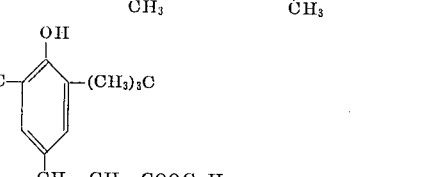

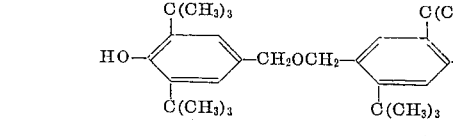

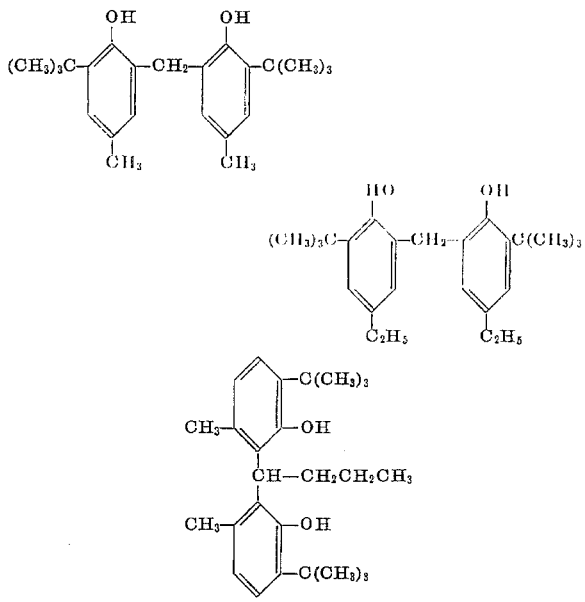

This improvement is found only when the hindered phenol is used in combination with the manganous ion. Where the hindered phenol is used alone, there is no significant improvement in dyed lightfastness over samples containing neither the manganous ion nor the hindered phenol. This would suggest that there is a synergistic action between the manganous ion and the hindered phenol; however this is only a theory. The hindered phenol, in any event, is believed to act as an anti-oxidant and will prevent dye degradation by oxidation.

If desired, the modified polyesters of this invention may contain chain-branching agents, which, as taught in U.S. Pat. No. 2,895,946, are employed to increase the viscosity or molecular weight of the polyesters, such as polyols which have a functionality greater than two; that is, they contain more than two functional groups, such as hydroxyl. Examples of suitable compounds are pentaerythritol; compounds having the formula: $R-(OH)_n$ wherein R is an alkylene group containing from three to six carbon atoms, for example, trimethylol ethane, trimethylol propane, and the like compounds up to trimethylol hexane; and the compounds having the formula:

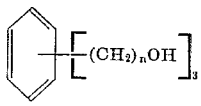

where $n$ is an integer from 1 to 6. As examples of compounds having the above formula, there may be named 1,3,5-trimethylol benzene; 1,3,5-triethylol benzene; 1,3,5-tripropylol benezene; 1,3,5-tributylol benzene; and the like.

Aromatic polyfunctional acids or their esters may also be employed in this invention as chain-branching agents, and particularly those having the formula:

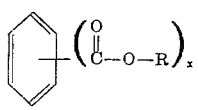

and in which R is H or an alkyl group containing one to three carbon atoms and $x$ is an integer of 3 or 4. As examples of compounds having the above formula, there may be named trimesic acid, trimethyl trimesate, and tetramethyl pyromellitate, and the like. In addition, there may be employed mixtures of the above acids and esters which are obtained in practical synthesis. That is, in most instances, when preparing any of the compounds having the above formula, other related compounds having the same formula may be present in small amounts as impurities. This does not affect the compound as a chain-branching agent in the preparation of the modified polyesters and copolyesters described herein.

The chain-branching agents may be employed in the preparation of the polyester and copolyesters in amounts ranging from 0 mole percent to 0.7 mole percent, based on the amount of dicarboxylic acid or ester-forming derivative thereof employed in the reaction mixture. If the chain-branching agent is tetrafunctional, as for example, pentaerythritol, quantities not in excess of 0.45 mole percent should be used. The preferred concentration of a tetra-functional chain-branching agent is about 0.2 mole percent. If a tri-functional chain-branching agent, such as for example, trimesic acid, is used, somewhat more is required for results equivalent to that of the tetra-functional chain-branching agent, and amounts up to 0.7 mole percent may be used. The preferred concentration of a tri-functional chain-branching agent is 0.5 mole percent.

In the practice of this invention, the dibasic acid or ester-forming derivative thereof, the glycol, and alkoxylpolyoxylalkylene glycol, the manganese salt and the hindered phenol are charged to the reaction vessel at the beginning of the first stage of the esterification reaction, and the reaction proceeds as in well-known esterification polymerization. If desired, the chain-branching agent may also be charged to the reaction vessel at this time.

When preparing the polyester from an ester, such as dimethyl terephthalate, the first stage of reaction may be carried out at 170° to 180° C. and at a pressure of 0 to 7 p.s.i.g. If the polyester is prepared from the acid, such as terephthalic acid, the first stage of reaction may be carried out at about 220° to 260° C. and at pressures of from atmospheric to about 60 p.s.i.g. The methanol or water evolved during the first stage of reaction is continuously removed by distillation. At the completion of the first stage, the excess glycol, if any, is distilled off prior to entering the second stage of the reaction.

In the second or polymerization stage, the reaction may be conducted at reduced pressures and preferably in the presence of an inert gas, such as nitrogen, in order to prevent oxidation. This can be accomplished by maintaining a nitrogen blanket over the reactants, the blanket containing less than 0.033 percent oxygen. For optimum results, a pressure within the range of less than 1 mm. up to 5 mm. of mercury is employed. This reduced pressure is necessary to remove the free ethylene glycol that is formed during this stage of the reaction, the ethylene glycol being volatilized under these conditions and removed from the system. The polymerization step is conducted at a temperature in the range of 220° to 300° C. This stage of the reaction may be effected either in the liquid melt or solid phase. In the liquid phase, particularly, reduced pressures must be employed in order to remove the free ethylene glycol which emerges from the polymer as a result of the condensation reaction.

Although the process of this invention may be conducted stepwise, it is particularly adaptable for use in the continuous production of polyesters. In the preparation of the described polyesters, the first stage of the reaction takes place in approximately three-fourths to 2 hours. The use of an ester-interchange catalyst is desirable when starting with dimethyl terephthalate. In the absence of a catalyst, times up to 6 hours may be necessary in order to complete this phase of the reaction. In the polymerization stage, a reaction time of approximately 1 to 4 hours may be employed with a time of 1 to 3 hours being the optimum, depending on catalyst concentration, temperature, viscosity desired, and the like.

The linear condensation polyesters, produced in accordance with the present invention, have specific viscosities in the order of about 0.25 to 0.6, which represent the fiber- and filament-forming polymers. It is to be understood, of course, that nonfiber-forming polyesters may be produced by means of the present invention, which have a greater or less melt viscosity than that specified above.

Specific viscosity, as employed herein, is represented by the formula:

$$\text{Nsp} = \frac{\text{Time of flow of the polymer solution in seconds}}{\text{Time of flow of the solvent in seconds}} - 1$$

Viscosity determinations of the polymer solutions and solvent are made by allowing said solutions and solvent to flow by force of gravity at about 25° C. through a capillary viscosity tube. In all determinations of the polymer solution viscosities, a solution containing 0.5 percent by weight of the polymer dissolved in a solvent mixture containing two parts by weight of phenol and one part by weight of 2,4,6-trichlorophenol, based on the total weight of the mixture is employed.

The polyesters of this invention may be produced to form filaments and films by melt-spinning methods and can be extruded or drawn in the molten state to yield products that can be subsequently cold-drawn to the extent of several hundred percent of their original lengths, whereby molecularly oriented structures of high tenacity may be obtained. The condensation product can be cooled and comminuted followed by subsequent remelting and processing to form filaments, films, molded articles, and the like.

Alternatively, the polyesters of this invention may be processed to shaped objects by the wet-spinning method, wherein the polyesters are dissolved in a suitable solvent and the resulting solution is extruded through a spinnerette into a bath composed of a liquid that will extract the solvent from the solution. As a result of this extraction, the polyester is coagulated into filamentary material. The coagulated material is withdrawn from the bath and is then generally subjected to a stretching operation in order to increase the tenacity to induce molecular orientation therein. Other treating and processing steps may be given the oriented filaments.

If it is desired to produce shaped articles from the polyesters of the present invention which have a modified appearance or modified properties, various agents may be added to the polyester prior to the fabrication of the articles or those agents may be incorporated with the initial reactants. Such added agents might be plasticizers, antistatic agents, fire-retarding agents, stabilizers, and the like.

To further illustrate the present invention and the advantages thereof, the following specific examples are given, it being understood that these are merely intended to be illustrative and not limitative. Unless otherwise indicated, all parts and percents are by weight.

The following procedure was used to prepare the polymers in the examples. The charge was added directly to a standard polyester autoclave and the system was purged six times with nitrogen, allowing the pressure to rise to 150 p.s.i.g., and then releasing it slowly to atmospheric pressure each time.

Heat was then applied to the closed system, and when the temperature inside the autoclave had reached 100° to 125° C., the stirrer was started. When the temperature of the outside wall of the autoclave had reached about 250° C. (the inside temperature being about 230° to 235° C. and the pressure being about 25 p.s.i.g.), the off-vapor valve was adjusted to maintain these conditions of temperature and pressure. As the first distillate containing water and some ethylene glycol appeared, the esterification stage was considered to have started. The stirrer speed was set up at 240 r.p.m. This esterification step usually took from about 40 to 60 minutes for completion, after which the pressure of the system was adjusted to atmospheric pressure. The heating rate was then increased until the temperature reached about 280° C. During this time, excess ethylene glycol was distilled off. An ethylene glycol slurry of titanium dioxide was introduced through an injection port when the inside temperature had reached about 260° to 265° C. Then the inside temperature was raised to about 280° C., the pressure was maintained at less than 2 mm. Hg. and the polymerization continued until a polymer having a specific viscosity in the fiber-forming range between 0.30 to less than about 0.4 was formed. The polymer was extruded through a spinnerette, and the filaments obtained were drawn about five times their original length over a hot pin at about 80° C.

The dyeing test used in Examples 1–8 was as follows: Fiber samples of about 3 denier were scoured and dried. One-half gram of fiber and 20 ml. of dye solution were placed in a small glass tube capable of withstanding internal pressure. The dye solution was prepared by mixing 250 mg. of a disperse dye and 0.5 gram of a commercial dispersing agent in a 250 ml. volumetric flask together with an amount of deionized water sufficient to fill the flask to the mark. The dye tubes were placed in a rotating rack held within a steam bath, and rotated for two hours at a temperature of about 210° F. The tubes were then quickly quenched in ice, and 5 ml. aliquots were pipeted into 50 ml. volumetric flasks which were then filled with dimethylformamide. The optical density of each solution was measured in a 1 cm. cell at the dominant wavelength of the dye. A blank tube (dye only) was also prepared and its optical density measured in the same way. The percent dye uptake on weight of the fiber (o.w.f.) was calculated using the following equation:

$$\frac{\text{O.D. blank} - \text{O.D. sample}}{\text{O.D. blank}} \times \frac{\text{original dye concentration}}{\text{(percent)}} = \text{percent dye uptake (o.w.f.)}$$

(where O.D. = optical density)

During the processing of polyester filaments, staple, blends, fabric, and the like, heating at various temperatures for various periods of time is often necessary, e.g., polyester fabrics may be subjected to temperatures of 175° C. or higher for periods of up to 10 minutes or more. The following thermal stability tests were run where indicated: A 5-gram sample of the polyester was fluffed into a ball, placed in an aluminum cup into which about 10 one-half-inch holes had been punched, and the ball was heated for 10 minutes at 175° C. in a circulating-air oven, often with a thermocouple held at the center of the ball.

EXAMPLE 1

The autoclave was charged with 166 grams of terephthalic acid, 440 ml. of ethylene glycol, 0.078 gram of lithium sulfate, 0.967 gram of antimony trioxide, 0.20 gram of pentaerythritol, and 10 grams of methoxypolyethylene glycol having an average molecular weight of about 550. Polymer and fiber were prepared following the procedure described above.

The fiber took up 2.2 percent o.w.f. of Latyl Brilliant Blue 2G dye (C.I. Disperse Blue 61). Unmodified polyethylene terephthalate took up 0.6 percent o.w.f. of this dye.

The fiber fused severely when heated at 175° C. for 10 minutes, the thermocouple within the carded ball recording at a temperature of 220° C.

EXAMPLES 2–8

Example 2 — The autoclave was charged with 165 grams terephthalic acid, 330 ml. ethylene glycol, 0.04 grams lithium acetate, 0.1 gram antimony glycoloxide, 0.3 gram pentaerythritol, and 8.0 grams of the reaction product of 4 molar equivalents of ethylene oxide with an approximately equimolar mixture of straight chain alcohols having 14 to 15 carbon atoms. Polymer and fiber were prepared following the procedure described in Example 1. Examples 3–8 were conducted in the same manner as Example 2 with the exception that the amounts of pentaerythritol used in each example were as follows: Example 3 — 0.15 grams; Example 4 — 0.2 grams; and Example 8 — 0.00 grams. The alkoxy poly(oxyalkylene) glycols used had the general formula: $RO[CH_2CH_2O]_x$—H for which the number of carbon atoms in the alkyl group R and the degree of polymerization of ethylene oxide (x) are shown in Table II. The resulting percent dye uptake is shown for each sample.

TABLE II

| Example | R | x | % Dye Uptake |
|---|---|---|---|
| 2 | 14–15 | 4 | 1.36 |
| 3 | 14–15 | 30 | 1.77 |
| 4 | 14–15 | 14 | 2.09 |
| 5 | 12 | 20 | 1.93 |
| 6 | 4 | 12 | 2.28 |
| 7 | 8 | 12 | 2.07 |
| 8 | 20 | 12 | 1.86 |

The above results further substantiate the data shown in FIGS. 1–3 and establish the relationship between R and x which is theorized above. Example 4 was tested for heat stability and resisted fusion when heated at 175° C. for 10 minutes.

The Xenon-Arc lamp exposure used in Examples 9-12 was as described in AATCC 16E-196. Reflectance readings of undyed substrates were generally in accordance with AATCC 110-1964.

EXAMPLE 9

The specified procedure was followed except that no glycol additive and no manganese was used in the run. The autoclave was charged with 166 grams of terephthalic acid, 400 milliliters of ethylene glycol, 0.078 gram of lithium sulfate, 0.967 gram of antimony trioxide, and 0.20 gram of pentaerythritol. Knit tubings were prepared from the filaments (3 denier) and given a Varsol scour, then disperse dyed with various dye combinations to six different shades shown at Table III. The shades were considered typical; two being light, two being medium, and two being heavy. Tubings were then exposed to the Xenon-Arc Fade-Ometer for 20, 40 and 80 SFH. The undyed tubings were exposed for 20 and 40 SFH.

EXAMPLE 10

Tubings were prepared as described in Example 9, except that the charge included a glycol additive having the formula: $R-O[G-O]_x-H$, R being an alkyl group containing an average of 14-15 carbon atoms, G being an ethylene radical, and $x$ being about 14. The alkoxy glycol additive was present in an amount of 1.2 mole percent.

EXAMPLE 11

The same procedure was followed as in Example 10, except that 50 parts per million, based on the weight of the acid and glycol, of manganese ion in the form of manganese acetate was added to the charge.

EXAMPLE 12

The same procedure was used as in Example 10, except that 100 parts per million of manganese ion in the form of manganese acetate was included in the charge.

EXAMPLE 13

The same procedure as in Example 10 was used, except that 100 parts per million of manganous ion in the form of manganese acetate, and 100 parts per million of 4,4' butylidenebis(6-t-butyl-m-cresol), was included in the charge.

EXAMPLE 14

The procedure of Example 10 was followed, except that 100 parts per million of 4,4' butylidenebis(6-t-butyl-m-cresol) was included in the charge. The manganese ion was not included.

TABLE III

Dyed Lightfastness

| Example | Xenon-Arc Fade-Ometer | | |
|---|---|---|---|
| | 20 SFH | 40 SFH | 80 SFH |
| Beige | | | |
| 9 | 4 lt. | 3-4 lt. | 3 lt. |
| 10 | 3-4 lt. | 3 lt. | 2 lt. |
| 11 | 4 lt. | 3-4 lt. | 2-3 lt. |
| 12 | 4 lt. | 3 lt. | 2-3 lt. |
| 13 | 4 lt. | 4 lt. | 3-4 lt. |
| 14 | 4 lt. | 3-4 lt. | 3 lt. |
| Light Blue | | | |
| 9 | 4 lt. | 3-4 lt. | 3-4 lt. |
| 10 | 3 lt. | 2 lt. | 1-2 lt. |
| 11 | 4 lt. | 3-4 lt. | 3 lt. |
| 12 | 3-4 lt. | 3 lt. | 2-3 lt. |
| 13 | 4 lt. | 3-4 lt. | 3 lt. |
| 14 | 3 lt. | 2-3 lt. | 2 lt. |
| Moss Green | | | |
| 9 | 3-4 lt. | 2-3 lt. | 2 lt. |
| 10 | 3 lt. | 2-3 lt. | 2 lt. |
| 11 | 4 lt. | 3-4 lt. | 2-3 lt. |
| 12 | 4 lt. | 3 lt. | 2 lt. |
| 13 | 3-4 lt. | 2-3 lt. | 2 lt. |
| 14 | 3-4 lt. | 2-3 lt. | 2 lt. |
| Gold | | | |
| 9 | 3-4 lt. | 3 lt. | 2-3 lt. |
| 10 | 3-4 lt. | 3-4 lt. | 2-3 lt. |
| 11 | 3-4 lt. | 3 lt. | 2-3 lt. |
| 12 | 4 lt. | 3-4 lt. | 2-3 lt. |
| 13 | 3-4 lt. | 3 lt. | 2-3 lt. |
| 14 | 3-4 lt. | 3 lt. | 2-3 lt. |
| Olive | | | |
| 9 | 4 lt. | 4 lt. | 3-4 lt. |
| 10 | 4 lt. | 3-4 lt. | 3 lt. |
| 11 | 3-4 lt. | 3-4 lt. | 3-4 lt. |
| 12 | 4 lt. | 3-4 lt. | 3-4 lt. |
| 13 | 4 lt. | 3-4 lt. | 3-4 lt. |
| 14 | 4 lt. | 3-4 lt. | 3 lt. |
| Navy | | | |
| 9 | 4 lt. | 3-4 lt. | 3 lt. |
| 10 | 4 lt. | 3-4 lt. | 3-4 lt. rd. |
| 11 | 4 lt. | 3-4 lt. | 3-4 lt. rd. |
| 12 | 3-4 dl. | 3-4 dl. | 3-4 dl. |
| 13 | 4 lt. | 3-4 lt. rd. | 3-4 lt. |
| 14 | 3-4 lt. | 3-4 lt. rd. | 3-4 lt. | lt. = light
dl. = dull
rd. = red

TABLE IV

Undyed Lightfastness

| Example | Color-Eye Reflectometer | | | Δ Values | |
|---|---|---|---|---|---|
| | lightness Y | Purity | DWL | ΔY | ΔP |
| Unexposed | | | | | |
| 9 | 84.5 | 2.1 | 479 | — | — |
| 10 | 81.2 | 1.6 | 471 471 | — | — |
| 11 | 81.9 | 0.6 | 489 | — | — |
| 12 | 83.5 | 0.6 | 480 | — | — |
| 13 | 83.4 | 0.1 | 496 | — | — |
| 14 | 84.5 | 1.0 | 477 | — | — |
| Exposed 20 SFH | | | | | |
| 9 | 85.0 | 2.4 | 475 | +0.5 | +0.3 |
| 10 | 81.8 | 1.1 | 476 | +0.6 | −0.5 |
| 11 | 82.3 | 1.3 | 473 | +0.4 | +0.7 |
| 12 | 83.8 | 1.6 | 470 | +0.3 | +1.0 |
| 13 | 83.8 | 1.1 | 469 | +0.4 | +1.0 |
| 14 | 84.5 | 1.0 | 481 | 0 | 0 |
| Exposed 40 SFH | | | | | |
| 9 | 85.3 | 2.2 | 476 | +0.8 | +0.1 |
| 10 | 82.5 | 0.7 | 485 | +1.3 | −0.9 |
| 11 | 82.6 | 1.2 | 473 | +0.7 | +0.6 |
| 12 | 83.8 | 1.6 | 475 | +0.3 | +1.0 |
| 13 | 83.9 | 1.0 | 469 | +0.5 | +0.9 |
| 14 | 84.8 | 0.6 | 491 | +0.3 | +0.4 |

Example 10 (Table III) shows the inherent inferior dyed lightfastness of the modified polyester. Examples 11 and 12 show how this inherently poor dyed lightfastness is improved to nearly that of the substantially unmodified polyester. The dyed lightfastness of the sample containing 100 parts per million of the manganese ion retained not less than above 3.8 at 20 SFH, 3.2 at 40 SFH, and 2.7 at 80 SFH according to average Gray Scale values. By comparison, the dyed lightfastness of the sample containing both the manganese ion and the hindered phenol retained not less than about 3.8 at 20 SFH, 3.3 at 40 SFH, and 3.0 at 80 SFH. This improvement, it will be noted, lies primarily in the light color ranges, and at the higher SFH exposures. In the medium color ranges there was little or no improvement, and in the case of moss green and gold, the figures show a slight loss in dyed lightfastness over the sample containing the manganous ion. This slight loss, however, is more than compensated by the improvement shown with lighter colors, and the fact that even with moss green and gold, there is no loss of dyed lightfastness at the higher SFH exposures. The undyed lightfastness values of Table IV show comparable whiteness retention in the undyed fibers.

It is to be understood the changes and variations may be made in the present invention without departing from the sphere and scope thereof as defined in the appended claims.

We claim:

1. A disperse dyeable thermally stable linear condensation polyester having inherent dyed lightfastness qualities, consisting of at least 85 percent by weight of the polyester of terephthalic acid and a dihydric alcohol selected from the group consisting of glycols of the series HO(CH$_2$)nOH, in which $n$ is an integer from 2 to 10, and cyclohexanedimethanol modified with about 0.25–3 mole percent, based on the weight of the acid, of a chain terminating compound having the general formula: R—O[G—O]$_x$—H, where R is an alkyl group containing 8–20 carbon atoms; G is a hydrocarbon radical selected from the group consisting of ethylene, propylene and isomers thereof, and butylene and isomers thereof, and $x$ is an integer having a value of from 8–20, and is about equal to or greater than the number of carbon atoms in R; and including about 10–500 parts per million, based on the weight of the acid and glycol, of manganous ion, and 50–150 parts per million of a hindered phenol selected from the group consisting of 4,4′-butylidenebis (6-t-butyl-m-cresol) and 2,2′-butylidenebis (6-t-butyl-m-cresol).

2. The new composition of matter defined in claim 1 wherein the synthetic linear condensation polyester is prepared from terephthalic acid and ethylene glycol, and further modified with up to about 0.45 mole percent, based on the amount of the terephthalic acid, of a tetra-functional chain-branching agent.

3. The new composition of matter defined in claim 2 wherein the chain-branching agent is pentaerythritol.

4. The new composition of matter defined in claim 1 wherein the synthetic linear condensation polyester is prepared from terephthalic acid and ethylene glycol, and further modified with up to about 0.7 mole percent, based on the weight of the terephthalic acid, of a tri-functional chain-branching agent.

5. The new composition of matter defined in claim 4 wherein the chain-branching agent is trimesic acid.

6. The new composition of matter defined in claim 2 wherein the chain-branching agent is pentaerythritol, in an amount of about 0.2 mole percent, based on the weight of terephthalic acid.

7. The new composition of matter defined in claim 4 wherein the chain-branching agent is trimesic acid in an amount of about 0.5 mole percent, based on the weight of the terephthalic acid.

8. The new composition of matter defined in claim 1 wherein the additive having the typical general formula R—O[G—O]$_x$—H is present in from about 0.75 to 2 mole percent, based on each polyester repeating unit, R is an alkyl group containing an average of 12–16 carbon atoms, G is an ethylene radical, and $x$ has a value of 14.

9. A fiber formed from the composition of claim 1.

* * * * *